S. A. HAWKINS.
ELBOW CONNECTION.
APPLICATION FILED MAY 23, 1907.
898,882.
Patented Sept. 15, 1908.
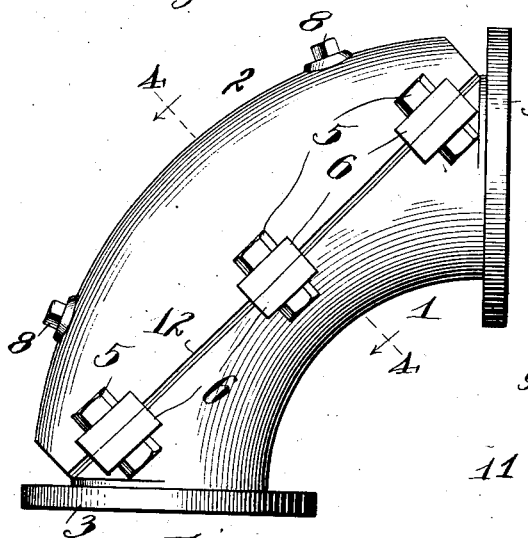
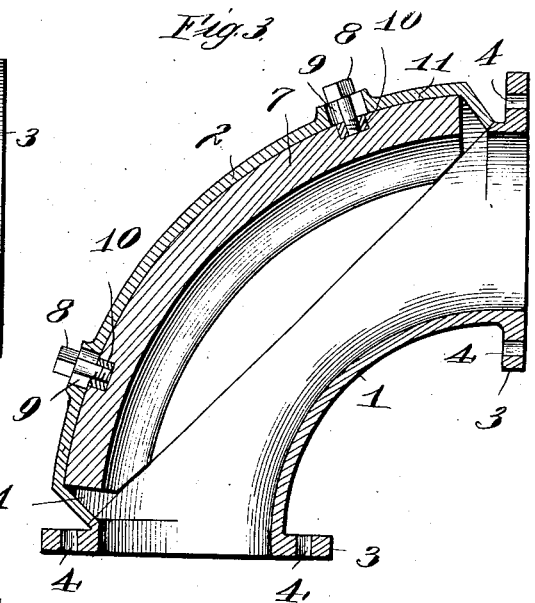
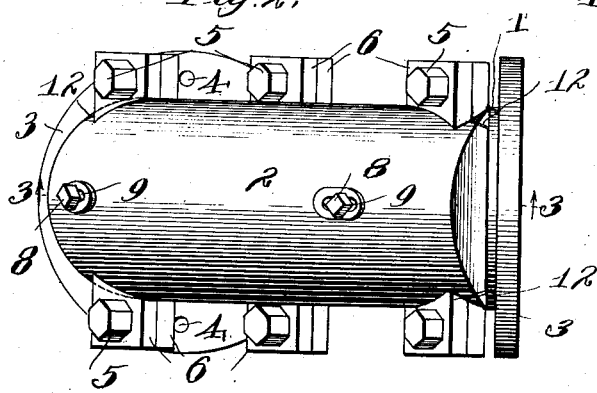
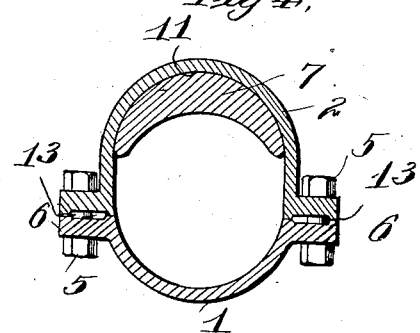
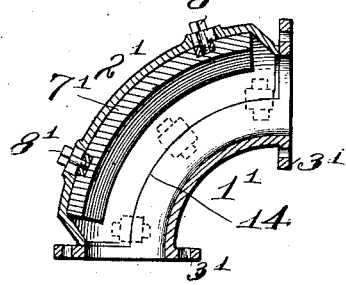
Witnesses:
Inventor,
Samuel A. Hawkins,
By Geo. E. Waldo,
Atty.

UNITED STATES PATENT OFFICE.

SAMUEL A. HAWKINS, OF CHICAGO, ILLINOIS, ASSIGNOR TO THE ECONOMIC ENGINEERING & CONSTRUCTION COMPANY, OF CHICAGO, ILLINOIS, A CORPORATION OF ILLINOIS.

ELBOW CONNECTION.

No. 898,882.      Specification of Letters Patent.     Patented Sept. 15, 1908.

Application filed May 23, 1907. Serial No. 375,224.

*To all whom it may concern:*

Be it known that I, SAMUEL A. HAWKINS, a citizen of the United States, and a resident of Chicago, in the county of Cook and State of Illinois, have invented certain new and useful Improvements in Elbow Connections, of which the following is a specification.

This invention relates to elbow pipe connections and relates particularly to elbow connections especially designed and adapted for use in conduits for conveying heavy objects at high velocities, as in the conduits of pneumatic ash conveyers of the general type shown and described in U. S. Letters Patent No. 851,054, in which said elbow is subjected to much wear from the abrading action of clinkers and other heavy hard substances passing through the same.

The object of the invention is to provide an elbow connection, the surface of which most exposed to wear consists of a refractory lining which may be quickly and conveniently renewed when worn out.

To this end an elbow connection of my invention consists of the various features, combinations of features and details of construction hereinafter described and claimed.

In the accompanying drawings, in which my invention is fully illustrated,—Figure 1 is a side view of an elbow pipe connection of my invention, in what I now consider its preferable form. Fig. 2 is a top plan view thereof as shown in Fig. 1. Fig. 3 is a sectional view on the line 3—3 of Fig. 2. Fig. 4 is a sectional view on the line 4—4 of Fig. 1; and Fig. 5 is a sectional side view of a modified form of elbow embodying my invention.

My improved elbow connection comprises a section 1 designed and adapted to be connected in permanent adjustment to the adjacent members of the conduit or pipe line, not shown, of which it forms a part, and a section 2 detachably secured to the section 1, by means independent of the means for connecting said elbow into the pipe line or conduit. As shown, said section 1 is provided at its ends with usual flanges 3 provided with bolt holes 4 adapted to receive the bolts for connecting said elbow to the adjacent members of the pipe or conduit, and the section 2 is removably connected to the section 1 by means of bolts 5 which pass through suitable holes or openings in lugs 6 on said sections 1 and 2.

It is obvious that, in a pneumatic conveyer for ashes and the like, the inner surface of the section 2 will be exposed to the greatest wear and, unless protected, will wear out long before other parts of said elbow connection or the straight sections of the pipe line or conduit. In order to render the section 2 more durable, it is made thicker than other parts of said elbow exposed to less wear. As shown, the extra thickness is provided by means of a lining 7 preferably made of very hard and refractory material, as white cast iron, and to provide for renewing the same quickly and at small cost, said lining is made separate from said section 2 and is adapted to be secured in position therein by means of screws 8, which pass through holes 9 in said section 2 and are threaded into suitable openings in said lining 7, as shown nuts 10 are preferably cast into said lining 7 in proper positions. To insure that the threaded openings of the nuts 10 will be exposed to the openings 9 in the sections 2 of the elbow to provide for easily engaging the screws 8 therewith, and to avoid nice fits and adjustments, the holes 9 are made somewhat larger than the threaded openings in the nuts 10 and are preferably somewhat elongated in the direction of the length of the elbow, so that said openings form in effect slots. With this construction it is obvious, that the lining 7 of the elbow section 2 can be quickly and conveniently renewed or replaced without disturbing the adjustment of the elbow section 1, by detaching said section 2 from said section 1, removing the worn lining 7 and substituting a new lining therefor. In this manner, it is obvious that the life of my improved elbow connection can be extended almost indefinitely, in a very simple manner and at a very slight cost.

In order that the inner surface of the lining 7 may be practically continuous with the inner surface of the elbow proper, the elbow section 2 is provided with a suitable recess, shown at 11, adapted to receive said lining 7, the depth of said recess being equal to the thickness of said lining.

My improved elbow will usually be made of cast iron and for purposes of convenience and economy in manufacture, I prefer to cast the same in a single piece and to subsequently sever the section 2 from the section 1. This will ordinarily be done by weakening the casting along desired lines of severance, as by forming grooves 12 in the outer surface thereof, said weakening grooves also extending through the lugs 6 in the form of holes 13 adapted to receive wedges or the like for subjecting the metal to the necessary strain for breaking the same.

It is found in practice that where metal is broken in this manner, it has a tendency to cleave in straight lines and for this reason I prefer to make the connected edges of the sections 1 and 2 straight, as shown in Figs. 1 to 4, inclusive. My invention, however, contemplates equally forming the sections of my improved elbow connection on curved lines, substantially concentric with the curve of the elbow, and in Fig. 5 of the drawings I have illustrated a modification of this character, the sections of the elbow being indicated by $1^1$ and $2^1$, respectively, and the joint between them by 14. Other elements of said elbow are substantially identical with corresponding elements in the other figures and are indicated by the same reference numerals.

In the form of my improved elbow shown in Fig. 5, the sections $1^1$ and $2^2$ thereof will preferably be cast separate from each other, owing to the liability of the line of cleavage diverging from the desired curve.

For purposes of convenient reference, the sections 1 and $1^1$ are designated in the claims as "main" sections and the sections 2 and $2^1$ as "wear" sections.

I claim:—

1. An elbow connection comprising a main section adapted for connection to members of a pipe line or conduit, a separate wear section, a renewable lining therefor, and independent means for detachably securing said wear section to said main section, whereby said wear section may be removed and replaced without disturbing the connections of said main section to said pipe line or conduit members.

2. An elbow connection comprising a main section adapted for connection to members of a pipe line or conduit, a separate wear section, a renewable refractory lining therefor and independent means for detachably securing said wear section to said main section, whereby said wear section may be removed and replaced without disturbing the connections of said main section to said pipe line or conduit members.

3. An elbow connection comprising a main section adapted for connection to members of a pipe line or conduit, and a separate section provided with a recess adapted to receive a lining, a separate lining removably secured in said recess and independent means for detachably securing said wear section to said main section, whereby said wear section may be removed and replaced without disturbing the connections of said main section to said pipe line or conduit members.

4. An elbow connection comprising a main section adapted for connection to members of a pipe line or conduit, a separate wear section, lugs on said sections provided with bolt holes and securing bolts which pass through said bolt holes whereby said wear section may be removed and replaced without disturbing the connections of said main section to said pipe line or conduit members, a separate lining for said wear section and means for securing the same in position comprising screws which extend through holes in said wear section and are threaded into said lining.

5. An elbow connection comprising a main section adapted for connection to members of a pipe line or conduit, a separate wear section and independent means for detachably securing said wear section to said main section, whereby said wear section may be removed and replaced without disturbing the connections of said main section to said pipe line or conduit members, the joint between said sections extending substantially on straight lines.

In testimony, that I claim the foregoing as my invention, I affix my signature in presence of two subscribing witnesses, this 16th day of May, A. D. 1907.

SAMUEL A. HAWKINS.

Witnesses:
K. A. COSTELLO,
M. WARD.